United States Patent [19]

Shute

[11] Patent Number: 4,606,390

[45] Date of Patent: Aug. 19, 1986

[54] VEHICLE RIM WITH TIRE BEAD RETAINING HUMPS

[75] Inventor: Anthony Shute, Colmar-Berg, Luxembourg

[73] Assignee: The Goodyear Tire & Rubber Company, Akron, Ohio

[21] Appl. No.: 768,380

[22] Filed: Aug. 22, 1985

[51] Int. Cl.⁴ .............................................. B60B 25/12
[52] U.S. Cl. ............................... 152/381.4; 152/379.3; 301/63 R
[58] Field of Search .................. 301/63 R, 97; 152/379.3, 381.3, 381.4, 381.5

[56] References Cited

U.S. PATENT DOCUMENTS

| | | | |
|---|---|---|---|
| 2,198,978 | 4/1940 | Sauer | 152/381.4 |
| 2,338,066 | 12/1943 | Weston | 152/381.3 |
| 4,246,950 | 1/1981 | Welter | 152/381.3 X |
| 4,561,482 | 12/1985 | Tavazza et al. | 152/381.4 |

FOREIGN PATENT DOCUMENTS

| | | |
|---|---|---|
| 1485780 | 9/1977 | United Kingdom . |
| 2117332 | 10/1983 | United Kingdom . |
| 2121738 | 1/1984 | United Kingdom . |

*Primary Examiner*—David A. Scherbel
*Attorney, Agent, or Firm*—L. R. Drayer

[57] ABSTRACT

A wheel rim (10) has a tire bead retaining means (20,21) disposed on the axially inner margin of at least one of its bead seats (14,15). The bead retaining means comprises a plurality of radially outwardly protruding humps (22) formed integrally with the rim. The humps (22) each extend circumferentially so as to merge one into another, and each hump has a radial height that gradually and continuously increases from a minimum height to a maximum height (H), and subsequently decreases back to the minimum height. The outer peripheral surface (28) of the bead retaining means between points (29) of maximum height (H) is a continuous arc having a radius ($R_2$) greater than the radius ($R_1$) of the rim bead seats, and at the points (31) of minimum height forms a tangent to a circle (27) concentric with the rim.

12 Claims, 2 Drawing Figures

VEHICLE RIM WITH TIRE BEAD RETAINING HUMPS

The present invention relates to a rim for a pneumatic tire which is designed to minimize bead unseating during use of the tire, especially when the tire is in a deflated state.

Many attempts have been made in the prior art to produce rims of the above type. A factor governing the design of such rims is that any means of retaining the tire bead on its seat should at the same time allow the tire to be mounted on the rim without excessive difficulties.

The prior art bead retaining means have frequently been formed integrally with the wheel rim, and these integral bead retaining means can be divided into two categories. In the first category are those rims having a substantially continuous annular abutment face which extends radially outwardly above the bead seat. In the International Standard ISO/DIS 3911 these continuous annular abutment faces are referred to as humps and frequently the hump height above the bead seat is limited to a height of between 1-2 mm. The height is limited in order to allow the tire bead to pass over the hump without difficulty during mounting of the tire.

In the second category are those rims which have a bead retaining means formed as a circumferentially discontinuous abutment face. A first type of discontinuous abutment face is an annular raised rib which is eccentric relative to the wheel rim so that in one position the rib has zero height above the bead seat, whereas in the diametrically opposite location on the rim it provides a relatively high abutment face of about 3 to 3.5 mm. This type of raised rib is known as an asymmetric hump. For details on wheel rims utilizing asymmetric humps for bead retention the reader is directed to the following patents: U.S. Pat. No. 4,246,950, which describes a rim with a single such hump; and GB No. 2,117,332, and GB No. 2,121,738 which describe rims having combinations of more than one asymmetric hump.

A second type of discontinuous abutment face is provided by a number of individual projections spaced circumferentially around the rim, for example as shown in British Patent GB No. 1,485,780. The discontinuous nature of these projections makes it possible for the radial height of the abutment face to exceed 2 mm while still allowing a tire to be mounted on the rim. When tires are mounted on rims the final bead seating is normally effected by inflating the tire with air until sufficient pressure exists within the tire to push the tire beads over any raised projections or ribs and onto the bead seats. It will be appreciated that in the prior art rims having discontinuous projections, air will escape from the gaps between the discontinuous projections at such a rate that the tire cannot be properly seated except with the aid of an inner tube.

The present invention seeks to provide a wheel rim having a high abutment face and on which a tire can be seated without major problems.

Accordingly there is provided a rim for supporting a pneumatic tire, said rim comprising a pair of circumferentially extending flanges in axially spaced apart relationship, and a pair of bead seats for seating the bead portion of a tire and each of which extends axially inwardly from a respective flange, at least one of the bead seats being provided at its axially inner margin with a bead retaining means comprising a plurality of radially outwardly projecting humps formed integrally with the rim and forming an annular abutment face characterized in that the abutment face is of varying radial height with respect to the bead seat and comprises a plurality of circumferentially extending humps which merge one into another, each hump having a radial height which gradually and continuously increases circumferentially from a minimum height to a maximum height and subsequently gradually and continuously decreases circumferentially to said minimal height where adjacent humps merge, the radially outer surface between the points of maximum height for any pair circumferentially of adjacent humps being a continuous arc having a radius greater than the minimum radius of the bead seats and at the point of minimum height forming a tangent to a circle concentric with the rim.

The invention will now be described with reference to the accompanying drawings.

Figure 1:
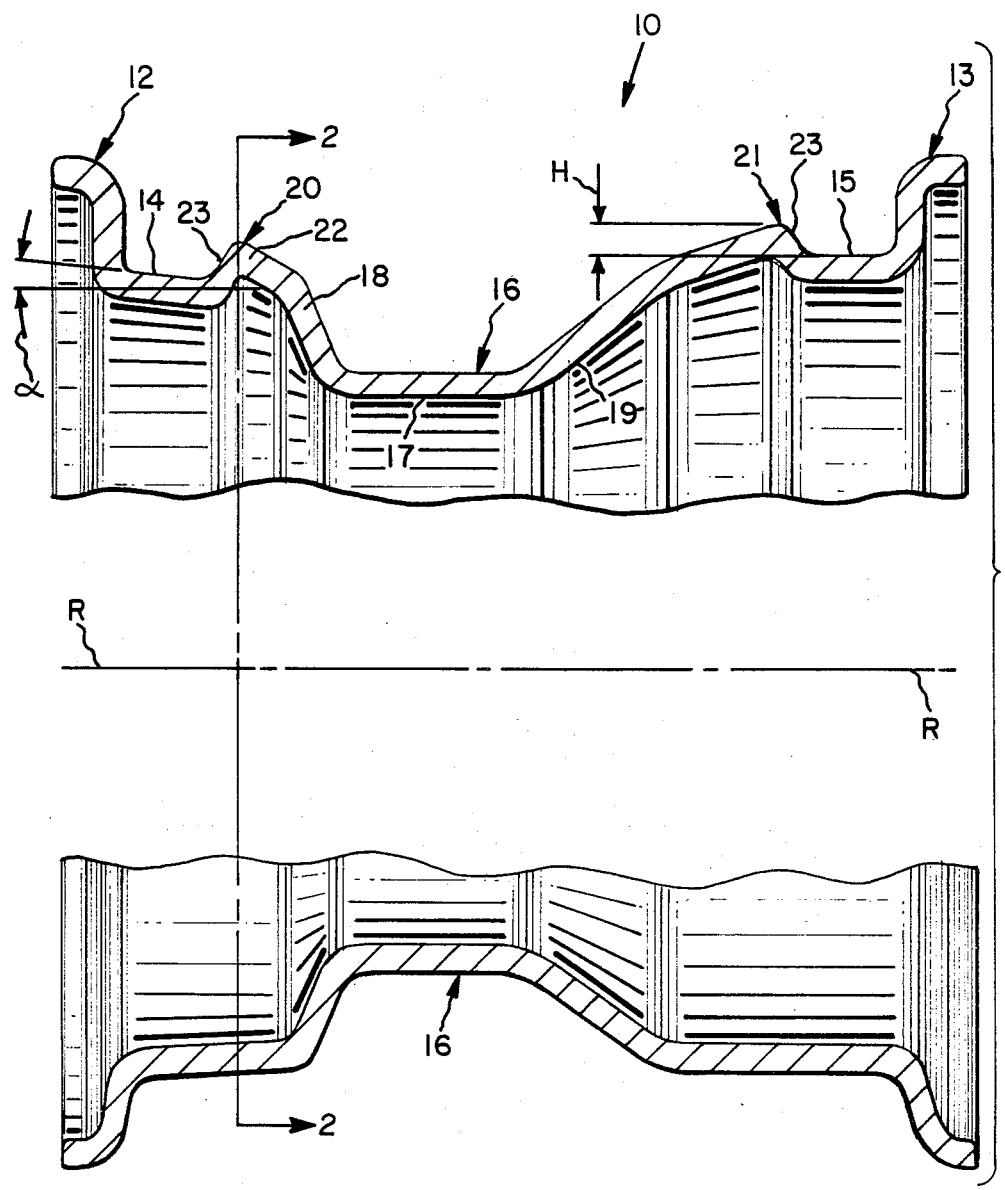
FIG. 1 illustrates a fragmentary radial cross sectional view of a rim according to the present invention, as viewed along line I—I of FIG. 2.

Referring to FIG. 1, there is illustrated a rim 10 for a passenger car and made in accordance with the present invention. Throughout this specification the term "rim" is used to designate a cylindrical structure upon which a tire is mounted and which is used with either an integral or a separate wheel disk. The rim 10 comprises a pair of axially spaced apart circumferentially extending flanges 12, 13. The radially inner ends of the flanges 12, 13 merge into the axially outer ends of a pair of bead seats 14, 15 respectively. For a typical passenger car rim the bead seats 14 and 15 have frustro-conical surfaces which make an angle $\alpha$ relative to the axis of rotation R—R of the tire. The angle $\alpha$ is normally in the range of 5° to 15°. The rim 10 further comprises a well 16 having a cylindrical base portion 17 and two side portions 18, 19. At the axially inner margins of each of the bead seats 14, 15 there are provided bead retention means 20, 21 located between the respective bead seat 14 or 15 and the well 16. FIG. 1 illustrates a rim having bead retention means adjacent to both bead seats on either side of the rim well. This need not necessarily be so, and the invention equally applies to rims where only one side of the rim is provided with bead retention means. The bead retention means 20 and 21 prevent dislocation of a tire bead, especially under cornering forces when tires mounted on conventional rims could have their beads displaced into the well 16.

Figure 2:
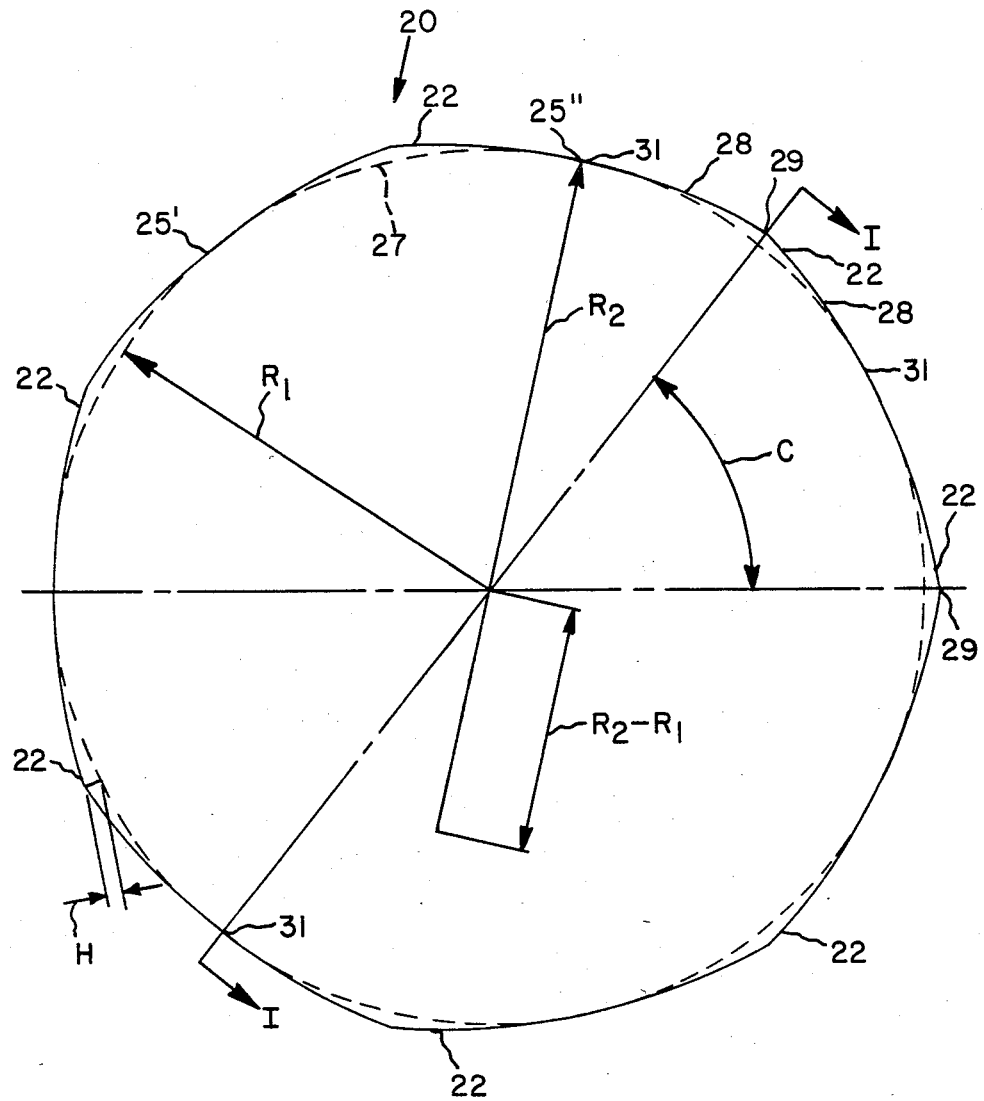
FIG. 2 illustrates a schematic sectional view along line 2—2 of FIG. 1.

The bead retention means 20, 21 can be described in greater detail with reference to FIG. 2, which is a cross sectional view of the rim illustrated in FIG. 1, taken along line 2—2. The bead retention means 20 and 21 each has an annular abutment surface 23 which in use will be adjacent the respective bead toe of a tire mounted on bead seats 14, 15 of the rim. Each bead retention means 20, 21 comprises a plurality of radially outwardly projecting humps 22 formed integrally with the rim and which are regularly spaced circumferentially about the rim. As can be seen from FIG. 2, the humps 22 extend circumferentially, each having a varying radial height with respect to the adjacent bead seat, and merge one into another around the rim 10. Each hump 22 has a minimum radial height with respect to the adjacent bead seat as measured radially of said axis at one end portion 25' thereof and which from said one end increases continuously and gradually to a predetermined maximum radial height H and subsequently decreases continuously and gradually back to the minimum radial height at the other end portion 25″ of the respective hump. The maximum radial height of each hump 22 occurs midway between its end portions.

In the embodiment illustrated, the bead retention means comprises seven humps 22 which each extend a circumferential distance C about rim 10 of 360/7=51°25′.

It is essential for a good working of the invention that the humps are disposed such that they merge circumferentially into one another. The dotted line shown in FIG. 2 illustrates a circle 27 which is concentric with the axis R—R of the rim and represents the diameter of each bead seat 14 or 15 at the axially inner margin adjacent the respective bead retaining means 20, 21. This circle 27 has a diameter which is substantially equal to the nominal diameter of the rim in that it is calculated from the nominal rim diameter and allows for the taper α of the bead seat and its axial width. The nominal rim diameter "NRD" is derived from the intersection of the bead seat with the inside vertical face of the rim flange. The NRD is a standard ETRTO (European Tyre and Rim Technical Organization) designation. As can be seen in FIG. 2 each hump 22 is the same maximum radial height H above the NRD circle and the height H is related to the number of humps 22 which are present in each bead retaining means. While the present embodiment is illustrated with seven humps 22, bead retaining means having from four to ten humps, and preferably six to eight humps, are envisaged within the scope of the invention.

Each hump 22 has a radially outer peripheral surface 28, which on each side of the maximum height point 29 thereof, describes an arc having a radius $R_2$ which is greater than the radius $R_1$ of the circle 27. In this particular case, the rim is for 14 inch tires and the NRD is about 355 mm, the radius $R_1$ of the circle 27 at the axially inner margin the bead seats 14 and 15 is 176.1 mm, and the radius $R_2$ of the arc is 276.1 mm. Pairs of circumferentially adjacent humps 22 are arranged so that the outer peripheral surface 28 between points of maximum radial height 29 is formed from a continuous arc having said radius $R_2$ made up of merged portions of the outer peripheral surface 28, and at the points of minimum height 31 the arc is a tangent to a circle concentric with the rim, preferably as in this case the circle 27 is located at the axially inner margin of the bead seat. Furthermore, the point of minimum radial height 31 is coincident with the location where the adjacent humps merge. In the present example the maximum radial height H of the humps is approximately 6.5 mm.

As previously described the maximum hump height H is related to the number of humps. It has been observed that when a tire is mounted on a rim according to the invention having humps thereon and then inflated to seat the beads on the bead seats, about 240°–260° of the circumference of the bead portion of said tire will seat immediately onto the bead seat 14 or 15 and only the last 100° or so of the tire bead circumference passes over any humps during the final bead seating. Therefore the maximum radial height H of the hump that the tire bead can tolerate during mounting is related to the number of humps over which the final 100° of tire bead circumference must pass, and the radius of the arc $R_2$ used for forming the humps. This observation allows for each individual maximum hump height H to be higher than might be expected if it were necessary for the total outer periphery of the bead retaining means to be considered.

In the present example for a 14″ wheel rim, the maximum radial hump height H that can be tolerated for a seven hump retaining means is about 9 mm, whereas if the retaining means consisted of only 5 humps the tolerable maximum height would be lifted to about 13 mm. This is because for a rim having a 5 hump retaining means the tire bead will only pass over a single hump in the final 100° of seating, whereas for a seven hump bead retaining means the tire bead must pass over two humps during the last 100° of seating. Similarly, for a bead retaining means of ten humps the maximum tolerable hump height is 7 mm.

It is observed that for a given size of rim n×H is substantially constant, where "n" is the number of humps in the bead retaining means and "H" is the maximum tolerable height.

It is important that the radially outer peripheral surface between the points of maximum height be formed as a continuous arc. This provides a reasonably good seal between the tire bead and the bead retaining means and allow for easier bead seating under inflation.

While the invention has been described with reference to rims for passenger car tires it is believed that it is equally applicable to rims suitable for truck tires.

I claim:

1. A rim for supporting a pneumatic tire, said rim comprising a pair of circumferentially extending flanges in axially spaced apart relationship, and a pair of bead seats for seating the bead portion of a tire and each of which extends axially inwardly from a respective flange, at least one of the bead seats being provided at its axially inner margin with a bead retaining means comprising a plurality of radially outwardly projecting humps formed integrally with the rim and forming a circumferentially extending abutment face characterized in that the abutment face is of varying radial height with respect to the bead seat and comprises a plurality of circumferentially extending humps which merge one into another, each hump having a radial height which gradually and continuously increases circumferentially from the minimum radius of said bead seat to a maximum height and subsequently gradually and continuously decreases circumferentially to said minimum radius of the bead seat where adjacent humps merge, the radially outer surface of said humps between the points of maximum height for any pair of circumferentially adjacent humps being a continuous arc having a radius greater than the minimum radius of the bead seats and forming a tangent to said bead seats midway between said points of maximum height.

2. A rim according to claim 1, characterized in that said circle concentric with the rim has a diameter equal to the diameter of the bead seats at their axial inner margins.

3. A rim according to claim 1 or claim 2, characterized in that each bead retaining means comprises between four and ten humps.

4. A rim according to claim 3, characterized in that the number of humps in each bead retaining means is equal to seven.

5. A rim according to claim 4 for use in combination with a passenger car tire whereby the maximum radial height of each hump as measured from a specified nominal rim diameter is at least 6 mm.

6. A tire and rim combination comprising a rim as claimed in claim 5 of the preceding claims and a tire mounted upon the rim.

7. A tire and rim combination comprising a rim as claimed in claim 4 of the preceding claims and a tire mounted upon the rim.

8. A tire and rim combination comprising a rim as claimed in claim 3 of the preceding claims and a tire mounted upon the rim.

9. A rim according to claim 1 or claim 2, for use in combination with a passenger car tire whereby the maximum radial height of each hump as measured from a specified nominal rim diameter is at least 6 mm.

10. A tire and rim combination comprising a rim as claimed in 9 of the preceding claims and a tire mounted upon the rim.

11. A tire and rim combination comprising a rim as claimed in claim 2 of the preceding claims and a tire mounted upon the rim.

12. A tire and rim combination comprising a rim as claimed in claim 1 of the preceding claims and a tire mounted upon the rim.

* * * * *